Figure 4:
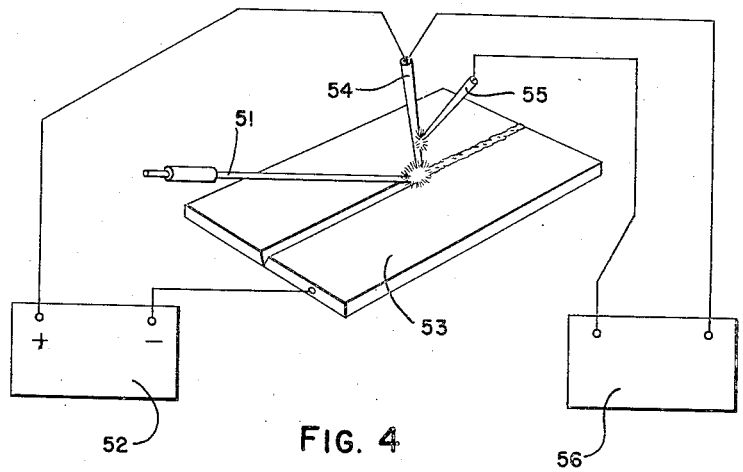

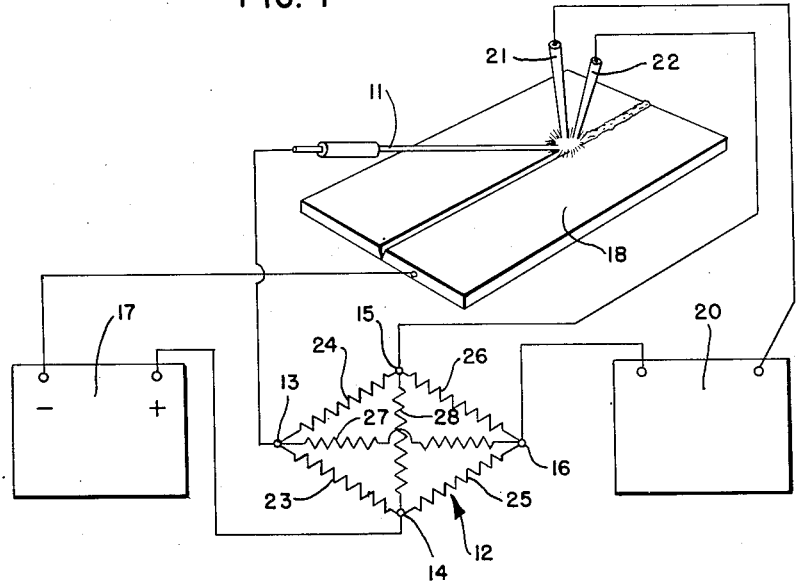
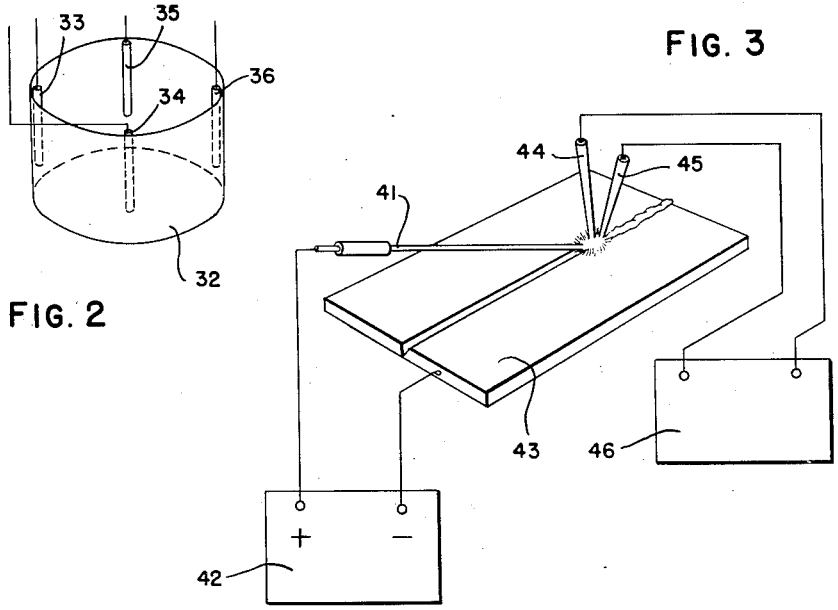
INVENTORS
COLBY WESTON STEWARD
BY MALCOLM R. RIVENBURGH
*Robert V. Morse*
ATTORNEY Aug. 16, 1949.                C. W. STEWARD ET AL                2,478,985
                         APPARATUS FOR MULTIARC WELDING
Original Filed March 9, 1944                                2 Sheets—Sheet 2

INVENTORS
COLBY WESTON STEWARD
BY MALCOLM R. RIVENBURGH

ATTORNEY

Patented Aug. 16, 1949

2,478,985

UNITED STATES PATENT OFFICE 2,478,985

APPARATUS FOR MULTIARC WELDING

Colby Weston Steward, Kenmore, and Malcolm R. Rivenburgh, Williamsville, N. Y., assignors, by mesne assignments, to Cornell Aeronautical Laboratory, Inc., Buffalo, N. Y., a corporation of New York Original application March 9, 1944, Serial No. 525,740. Divided and this application March 29, 1947, Serial No. 738,098

7 Claims. (Cl. 315—160)

This application is a division of application Serial No. 525,740 filed March 9, 1944, now Patent No. 2,437,840.

The present invention relates to arc welding. More specifically, it relates to the arc welding of thin metals, and is particularly suited for aluminum and its alloys.

The fusion welding of very thin sheet metal is difficult, and in the case of light alloys hitherto has been practically impossible. It is generally considered impractical to arc weld a butt joint in aluminum or aluminum alloy sheet, when the thickness is less than ⅛ inch. When a sheet of this order of thickness is composed of 24S aluminum alloy, it has been almost impossible to make, by existing methods, a fusion weld which would not crack as fast as it was welded.

It is therefore an object of this invention to provide an apparatus which can be employed to fusion weld aluminum and aluminum-base alloys as thin as 1/60 (0.016) inch without cracking. It is another object to provide such an apparatus which can be employed to butt weld aluminum and aluminum-base alloys sheets so as to develop from 75 to 100 percent of the full strength of the sheet metal in a tension test. Other objects will appear hereinafter.

These objects are accomplished, according to the present invention, by providing an arc welding method wherein two or more arcs are operative at the same time during the fusion period, and in which one of the arcs is struck between the work piece and an electrode, preferably a flux-coated or similar consumable metallic electrode, preferably with a direct current source, and another arc is struck with a carbon electrode as at least one of its electrodes, preferably with an alternating current source.

Figure 5:
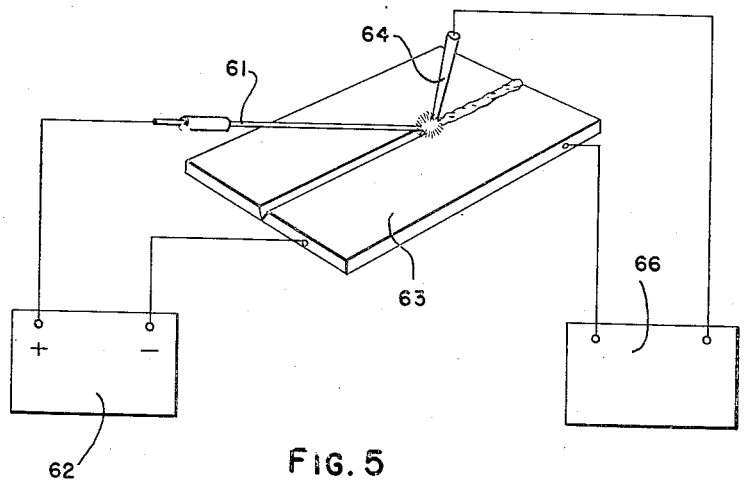

In the drawings:

Figure 1 is a general schematic view of a preferred arrangement for practicing the present invention. Figure 2 is a schematic view of a salt solution which may be substituted for the resistance network operating as a resistance medium in the arrangement of Figure 1. Figure 3 is a general schematic view of another arrangement for practicing the invention in which two independent electric circuits are provided to secure two arcs. Figure 4 is a general schematic view of still another arrangement for practicing the invention, in which the two electric circuits are connected through one of the carbon electrodes. Figure 5 is a general schematic view of still another arrangement for practicing the invention, in which the two electric circuits are connected through the work piece.

One of the arcs, in accordance with the preferred embodiment of this invention, is struck between two similar carbon electrodes, and may be termed a twin carbon arc, or a twin carbon torch. Conveniently, it may be produced by means of a pair of carbon rods held at an angle to each other. In practice, it has been found that ordinary commercial carbon welding rods approximately 6 or 8 inches long and ⅛ to ⅜ inch in diameter may be used, held at an angle of approximately 10° to 15° or more to each other. The heat produced by the twin carbons may be varied by regulating the arc gap and also by moving the torch near to or away from the work. The twin carbon arc or twin carbon torch may be supplied with current from any suitable source, such as a commercial alternating current welding machine. Best results are obtained when alternating current is used for the twin carbon torch, although direct current may also be used. Alternating current has the advantages that equal burn-off of the carbons is provided and that symmetrical arcing from the carbons to the work piece occurs, which would not be the case for direct current.

The use of the twin carbon torch has a number of advantages and functions. Firstly, it serves to preheat the sheet at the starting point of welding. Secondly, the degree of heat can be controlled, as described above. Thirdly, the presence of the arc acts as a partially shielded atmosphere. Fourthly, when used in combination with a metallic arc as hereinafter described, it assists in supporting the metallic arc, because the current used in the metallic arc circuit is, in this process, too low to be maintained independently of the carbon torch. Fifthly, it helps to melt the metal and flux of the filler rod. These functions and advantages assist in securing perfect fusion while welding aluminum and aluminum alloys.

A second arc, in accordance with the preferred embodiment of this invention, is struck between the work piece and any suitable metallic electrode, preferably flux-coated, although bare electrodes may also be used. For this circuit, direct current is preferably used, and any suitable source, such as a commercial direct current welding machine, may be employed for this purpose. The polarity for the metallic arc may be either straight or reversed, depending upon the material to be welded and the rod used. Reverse polarity (i. e. with the work-piece the negative terminal) is preferably used with thin sheets, particularly while welding aluminum and aluminum alloys. Accurate control of the current for the metallic arc is obtained by the use of a rheostat. The metallic arc may be continuous or intermittent as desired, depending upon the manipulation of the rod.

With the use of a twin carbon arc and a metallic arc, as described above, it is preferred to interconnect the sources of current for these two arcs by means of a resistance network or analogous means. With this arrangement, a number of additional arcs are formed which greatly assist in the welding operation. Thus, with one of the twin carbon electrodes connected through a resistance network to the source of alternating current, and the metallic electrode connected through another portion of the same resistance network to the source of direct current, a number of additional arcs are obtained, which may be observed through the medium of high-speed photography. One of these additional arcs passes from one carbon electrode to the work piece, another from the second carbon electrode to the work piece, and a third from one of the carbon electrodes to the metallic electrode. A total of five arcs is thus secured with this arrangement.

In the preferred form of the invention, a twin carbon arc is used at the start to preheat the work piece, or the metallic rod, or both. During this period, the arc is playing between the carbon electrodes. The metallic electrode and the twin carbon electrodes are then brought closer to each other, and finally the metallic electrode is brought so as to be almost touching the plate. The arcs then pass between the flux-coated electrode, the carbon electrodes, and the work, thereby producing the necessary welding heat by means of a multiplicity of arcs.

Referring now to Figure 1 of the drawings, a flux-coated metallic electrode 11 is connected through terminals 13 and 14 and resistance element 23 of a resistance network 12 to the positive terminal of a direct current welding machine 17, supplying direct current at 50 to 100 volts. The negative terminal of the welding machine 17 is directly connected to the work piece 18. Two carbon electrodes 21 and 22 constitute a twin carbon electrodes, and are connected to an alternating current welding machine 20, supplying alternating current at 50 to 100 volts. Electrode 21 is connected directly, while electrode 22 is connected through terminals 15 and 16 and resistance element 26 of resistance network 12. Interconnection between the alternating current circuit and the direct current circuit is obtained through resistance elements 24, 25, 27 and 28 in resistance network 12 and forming connections between resistances 23 and 26. The resistances 23, 24, 25, 26 and 27 and 28 may have any convenient quantitative value necessary to secure the proper control of the welding operation and the arcs formed therein.

In operation, an arc is first struck between electrodes 21 and 22. The metallic electrode 11 is then brought close to the work piece 18, after which the twin carbon torch is brought adjacent to both the metallic electrode 11 and the work piece 18. When the proper degree of pre-heat has been attained, the second arc, between the flux-coated electrode 11 and the work piece 18, is struck, and the welding operation completed by working the electrodes along the joint to be welded, as shown in Figure 1. During this operation, multiple arcs will be evolved, i. e. from the metallic electrode 11 to the work piece 18 and to one of the carbon electrodes 21 and 22, from the work piece 18 to each of the carbon electrodes 21 and 22, and from the carbon electrodes 21 and 22 to each other. This arrangement will secure a confined, easily controlled heating effect necessary for joining aluminum and aluminum alloys by fusion welding.

It is obvious that the arrangement of the circuits is not limited to that shown in Figure 1. For example, one terminal of the alternating current source may be connected to the work piece as well as to one of the carbons, producing a variable two-way action of the carbon arc between the carbons or from either of the carbons to the work piece, depending upon the distance of the carbon from the work piece. An arc may also be drawn from one of the carbons to the meallic electrode or any combination of the above. It is obvious that, with two electrical circuits, three electrodes and the work piece, there are numerous possible combinations.

Salt solutions, chokes or other equivalent devices, suitably arranged to produce the same stabilizing effect and fine adjustment of current as the resistance network 12, may be substituted for such resistance network. A vessel 32 containing a saline solution, for this purpose, is shown in Figure 2 of the drawings, wherein the copper plates 33, 34, 35 and 36 are hung in the solution and connected to the various elements shown in Figure 1, in place of terminals 13, 14, 15, and 16, respectively, of the resistance network 12. In addition, it is obvious that a self-contained power unit may be utilized, comprising a suitable alternating-current transformer and a copper-oxide, electronic, electrolytic, or other equivalent rectifier with resistors, chokes and reactors necessary to give good stability and fine adjustment of current.

Referring now to Figure 3, this illustrates a form of the invention in which the two electrical circuits are electrically independent. The electrode 41 is connected directly to the positive terminal of the direct current welding machine 42, while the work piece 43 is connected directly to the negative terminal of the welding machine 42. The two carbon electrodes 44 and 45 are similarly directly connected to the alternating current welding machine 46. In this form, there is considerably less control of the various arcs than in the form shown in Figure 1. However, the arc between electrodes 44 and 45 does assist in supporting the arc between electrode 41 and work piece 43. The operation is similar to that of the form shown in Figure 1.

In Figure 4 is shown a form of the invention in which both direct current welding machine 52 and alternating current welding machine 56 are connected to one of the carbon electrodes 54. The other (negative) terminal of the welding machine 52 is connected to the work piece 53, while the flux-coated filler rod 51 is not electrically connected. The second carbon electrode 55, connected to the welding machine 56, is shorter than the electrode 54, so that one arc is struck between the end of electrode 55 and the side of electrode 54, and the other arc between electrode 54 and work piece 53. In operation, an arc is first drawn between the two carbon electrodes 54 and 55. This preheats the long carbon 54. Then the latter is touched to the work piece 53 so as to draw an arc there. From the two arcs, sufficient heat is developed to bring the surface of the work piece 53 and the filler rod 51 up to welding temperature.

In the form shown in Figure 5, the two electrical circuits are connected through the work piece 63. In this form only a single carbon electrode 64 is employed, connected to one terminal of the alternating current welding machine 66. The opposite terminal of the welding machine 66 and the negative terminal of direct current welding machine 62 are both connected to the work piece 63. The positive terminal of welding machine 62 is connected to a flux-coated or bare metallic rod 61. In operation, an arc is first struck between electrode 64 and the work piece 63, in order to preheat the work piece. The metallic electrode 61 is then introduced so as to be almost touching the work piece 63, shifting the arc to pass between the carbon electrode 64, the metallic electrode 61 and the work piece 63, each arc supplementing the others.

In addition to the advantages previously mentioned, surface cleaning is not generally necessary while welding according to the present invention.

The above discussion has been in connection with several specific forms of the invention. It is obvious, however, that many changes may be made in these forms without departing from the spirit of the invention. It is to be understood, therefore, that the invention is not to be limited except as defined in the appended claims.

We claim:

1. In an arc welding apparatus, the combination of a work piece, a source of alternating current, a pair of carbon electrodes connected to said alternating current source whereby a heating arc may be formed in proximity to the work piece, a source of direct current, a metallic welding electrode connected to said direct current source, said direct current metallic electrode being movable in the atmosphere of the alternating current heating arc to carry out the welding, and the alternating current arc being movable relative to the work piece to vary the heating.

2. In an arc welding apparatus, the combination of a source of alternating current, a pair of carbon electrodes connected to said source of alternating current, a source of direct current, a metallic welding electrode connected to said source of direct current means for electrically connecting a work piece to the direct current source to provide a direct current welding arc between the metallic welding electrode and the work piece, and means for maintaining an alternating current arc between the two carbon electrodes independently of the direct current arc at the metallic electrode, whereby the position of the metallic electrode relative to the two carbon electrodes may be varied to facilitate the welding.

3. In an arc welding apparatus, the combination of a source of alternating current, a pair of carbon electrodes energized by said alternating current and adapted to form a heating arc, the amount of heat being controlled by moving said arc relative to an object being welded, a source of direct current, a metallic welding electrode energized by said direct current and moveable into and out of the atmosphere of the alternating current heating arc, whereby the direct current welding may be facilitated, and means for electrically connected the object being welded to the source of direct current to provide a direct current welding arc from the metallic welding electrode to the object being welded.

4. In an arc welding apparatus, the combination of a work piece, a source of alternating current, carbon electrodes connected to said alternating current source, a source of direct current, a metallic welding electrode connected to said direct current source, the carbon electrodes being movable as a unit relative to the work piece to control the environment in which the welding is to be conducted, and said metallic direct current welding electrode being independently movable relative to the two carbon electrodes and to the work piece, to effectuate the welding in the favorable atmosphere created by the arc of the carbon electrodes.

5. In an arc welding apparatus, the combination of a source of alternating current, a twin carbon torch energized by said alternating current to produce a heating arc, a metallic welding rod, a source of direct current energizing said metallic welding rod, and an electrical connection to provide a direct current welding arc at the work to be welded, the current in the metallic welding circuit being too low to maintain welding conditions independently of the said heating arc.

6. An arc welding apparatus, comprising a source of alternating current, a source of direct current, one terminal of said first source being electrically connected to one terminal of said second source, a first arc, a second arc adjacent to said first arc, a pair of carbon electrodes each connected through an electrical circuit to a separate terminal of said source of alternating current and constituting the electrodes of said first arc, a work piece connected through an electrical circuit to one terminal of said source of direct current and constituting an electrode of said second arc, and a metallic welding rod connected through an electrical circuit to the other terminal of said source of direct current and constituting the other electrode of said second arc.

7. An arc welding apparatus, comprising a source of alternating current, a source of direct current, a first arc, a second arc adjacent to said first arc, a pair of carbon electrodes connected through an electrical circuit to separate terminals of said source of alternating current and constituting the electrodes of said first arc, a work piece connected through an electrical circuit to one terminal of said source of direct current and constituting an electrode of said second arc, a metallic welding rod connected through an electrical circuit to the other terminal of said source of direct current and constituting the other electrode of said second arc, a first resistance medium in said first mentioned circuit connecting a terminal of said source of alternating current to one of said carbon electrodes, second resistance medium in the circuit from the terminals of said source of direct current, and a network of resistance mediums connecting said first and second resistance mediums.

COLBY WESTON STEWARD.
MALCOLM R. RIVENBURGH.

No references cited.